(12) United States Patent
Stefan et al.

(10) Patent No.: US 9,111,450 B2
(45) Date of Patent: Aug. 18, 2015

(54) METHOD AND SYSTEM FOR PARKING ASSISTANCE FOR A VEHICLE

(71) Applicant: FORD GLOBAL TECHNOLOGIES, LLC, Dearborn, MI (US)

(72) Inventors: Frederic Stefan, Aachen (DE);
Christoph Arndt, Rheinland-Pfalz (DE);
Uwe Gussen, Huertgenwald (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/446,966

(22) Filed: Jul. 30, 2014

(65) Prior Publication Data
US 2015/0039211 A1 Feb. 5, 2015

(30) Foreign Application Priority Data
Aug. 2, 2013 (DE) .......................... 10 2013 215 208

(51) Int. Cl.
*B60Q 1/48* (2006.01)
*G08G 1/14* (2006.01)

(52) U.S. Cl.
CPC ................ *G08G 1/148* (2013.01); *G08G 1/143* (2013.01); *G08G 1/144* (2013.01); *G08G 1/149* (2013.01)

(58) Field of Classification Search
USPC ................... 705/418, 13; 340/932.2; 40/333;
455/456.1, 422.1, 456.3; 701/117, 408
See application file for complete search history.

(56) References Cited

U.S. PATENT DOCUMENTS

| | | | |
|---|---|---|---|
| 2005/0280555 A1* | 12/2005 | Warner | 340/932.2 |
| 2008/0114675 A1* | 5/2008 | Ward | 705/39 |
| 2010/0280956 A1* | 11/2010 | Chutorash et al. | 705/64 |
| 2011/0099126 A1* | 4/2011 | Belani et al. | 705/418 |
| 2012/0095790 A1* | 4/2012 | Stefik et al. | 705/5 |
| 2012/0194354 A1* | 8/2012 | Kundmueller et al. | 340/932.2 |
| 2014/0125279 A1* | 5/2014 | Juhasz | 320/109 |
| 2014/0225763 A1* | 8/2014 | Kavaler et al. | 342/70 |
| 2014/0310075 A1* | 10/2014 | Ricci | 705/13 |

FOREIGN PATENT DOCUMENTS

| | | |
|---|---|---|
| DE | 102009057647 A1 | 6/2011 |
| WO | 2013006549 A2 | 1/2013 |

* cited by examiner

*Primary Examiner* — Ronnie Mancho
(74) *Attorney, Agent, or Firm* — Frank A. MacKenzie; Brooks Kushman P.C.

(57) ABSTRACT

A method and system for parking assistance for a vehicle, wherein the parking of said vehicle on a parking space at least partly occupied by a second vehicle is enabled by transmitting a maneuver request to the second vehicle. The method includes the steps of: allocating a priority to the driver of the first vehicle, wherein said priority implements a classification of said driver with respect to the extent to which the driver is entitled to the prioritized use of the parking space; and transmitting the maneuver request to the second vehicle based on said priority.

20 Claims, 3 Drawing Sheets

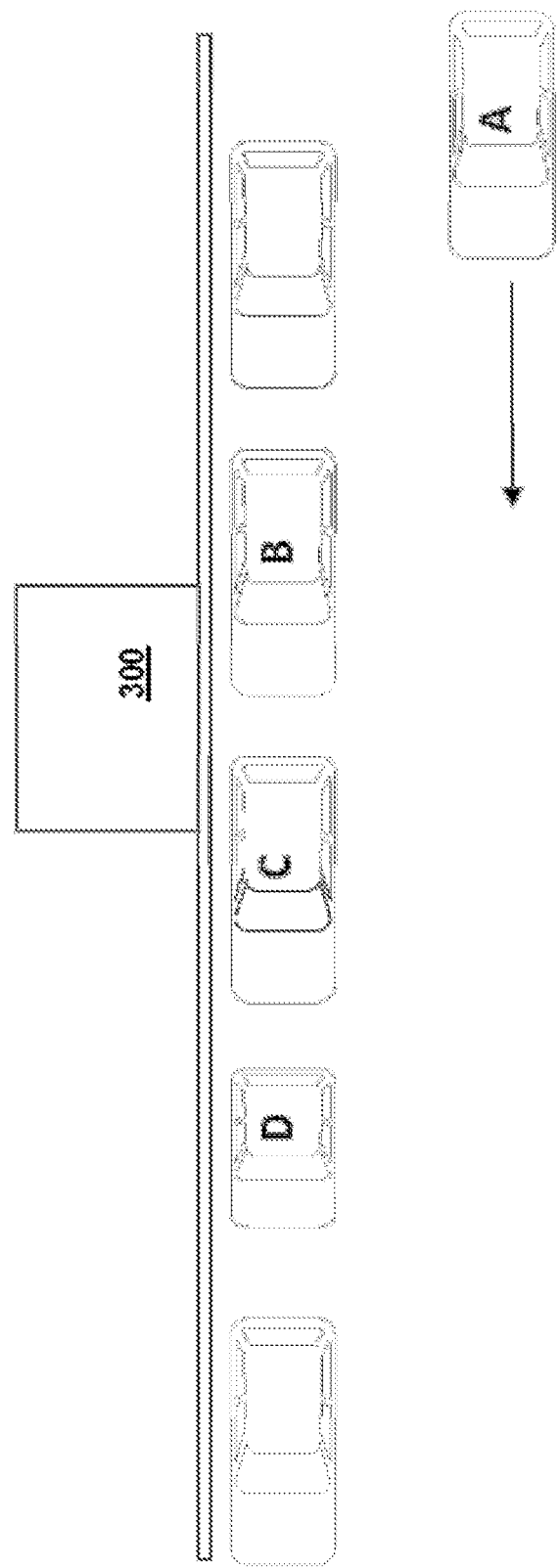

METHOD AND SYSTEM FOR PARKING ASSISTANCE FOR A VEHICLE

CROSS-REFERENCE TO RELATED APPLICATIONS

This application claims foreign priority benefits under 35 U.S.C. §119(a)-(d) to DE 10 2013 215 208.6 filed Aug. 2, 2013, which is hereby incorporated by reference in its entirety.

TECHNICAL FIELD

Owing to the lack of available parking spaces in areas such as inner cities, the driver of a motor vehicle frequently finds no parking space at a desired location. On the one hand this is annoying because of the additional time loss, but it can also be particularly critical for certain groups of people (e.g. persons with limited mobility or health problems, pregnant women etc.).

Moreover, the lack of available parking spaces nearby causes stress in the respective driver, requires additional energy, results in added air contamination and can lead to a critical degradation of the state of their health for certain drivers (such as e.g. with an older person with leg pain or a pregnant woman, who because of the lack of a free parking space near their residence have to cover a long distance between the car park and the residence). Even so-called residential parking spaces do not guarantee the availability of a free parking space at all times of day.

BACKGROUND

A method and a device for arranging the parking positions of at least two motor vehicles are known from DE 10 2009 057 647 A1, wherein one of the motor vehicles comprises an interface for communications with another motor vehicle, which has another corresponding interface. Furthermore, a unit is provided in the respective motor vehicle for autonomous maneuvering of the motor vehicle. In response to the reception e.g. of a parking or unparking request of the other motor vehicle via the interface, a maneuver is carried out depending on the maneuver request and thus a contribution is made to the cooperative optimization of parking space.

A method and a device for the dynamic allocation of parking spaces in inner cities are known from WO 2013/006549 A2, wherein the efficient and intelligent utilization of the total existing parking capacity should be ensured.

It is an object of the present invention to provide a method and a system for parking assistance for a vehicle that prevent or at least reduce the stress resulting from searching for parking spaces for drivers particularly affected by this.

SUMMARY

A method for parking assistance for a vehicle, wherein the parking of said first vehicle on a parking space at least partly occupied by a second vehicle is assisted by transmitting a maneuver request to the second vehicle, includes the following steps:

allocating a priority to the driver of the first vehicle, wherein said priority implements a classification of said driver as to the extent to which the driver is entitled to a prioritized use of the parking space; and transmitting the maneuver request to the second vehicle based on said priority.

The present invention is especially based on the concept of registering or identifying certain drivers that are entitled to occupy a parking space in certain areas (e.g. a certain road) with a priority relative to other road users. If such a driver is seeking a parking space in a certain target area and no free parking space is available, according to the invention the most suitable parking space can be sought in respect of especially e.g. vehicle dimensions, energy costs and the parking arrangement of the other vehicles that are already parked. Thereupon, one of the parked vehicles can be requested by remote control to move away and to find or seek another parking space.

In order to minimize the likelihood of stressing or annoying the other road users, the implementation and activation of the previously described function can be carried out on a voluntary basis. In particular, vehicle owners that allow autonomous or remotely controlled movement of their vehicles to another location can be rewarded for this facility.

According to one embodiment, a request is transmitted to the second vehicle as a maneuver request to seek a new parking space including leaving the parking space.

The method can further include the step of the automatic unparking of the second vehicle.

According to one embodiment, the parking space is selected from a plurality of at least partly occupied parking spaces. Said automatic selection can especially take place while taking into account at least one of the following criteria:

the dimensions of the respective partly occupied parking spaces;

the distance of the respective partly occupied parking spaces from the destination of the driver of the first vehicle;

the capability of the vehicles occupying the respective parking spaces to drive away independently and seek another parking space;

the energy cost of the vehicles occupying the respective parking spaces for seeking a new parking space; and the remaining fuel supply or energy supply of the vehicles occupying the respective parking spaces.

According to one embodiment, the method also includes the steps: determining the current condition of the driver of the first vehicle and transmitting the maneuver request to the second vehicle based on the determined condition.

According to one embodiment, transmitting the maneuver request to the second vehicle also takes place on the basis of the current location of the first vehicle.

According to one embodiment, the allocation of a priority to the driver of the first vehicle takes place at least partly on the basis of information that is automatically retrieved from a database.

According to one embodiment, the allocation of a priority to the driver of the first vehicle at least partly takes place on the basis of information relating to the state of health of the driver.

The invention also relates to a system for parking assistance for a vehicle, wherein the parking of said first vehicle on a parking space at least partly occupied by a second vehicle is assisted by transmitting a maneuver request to the second vehicle, wherein the system is designed to carry out a method with the features described above.

According to one embodiment, the system comprises:

a driver identification module configured to determine the priority of the driver of the first vehicle;

a vehicle location module configured to determine whether the first vehicle is within a local area in which the driver of the first vehicle is entitled to prioritized parking;

a parking space selection module configured to analyze the spatial arrangement of already parked vehicles for the purpose of determining a most suitable parking space for the first vehicle; and a vehicle communications module configured to communicate with parked vehicles and to request said vehicles to move away and seek a new parking space.

Other embodiments of the invention are to be found in the description and in the dependent claims. The invention is explained below using an exemplary embodiment with reference to the accompanying figures.

BRIEF DESCRIPTION OF THE DRAWINGS

FIG. 1 shows a schematic diagram of an exemplary embodiment of a system according to the invention in;

FIG. 3 shows a schematic diagram illustrating an embodiment of the method according to the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
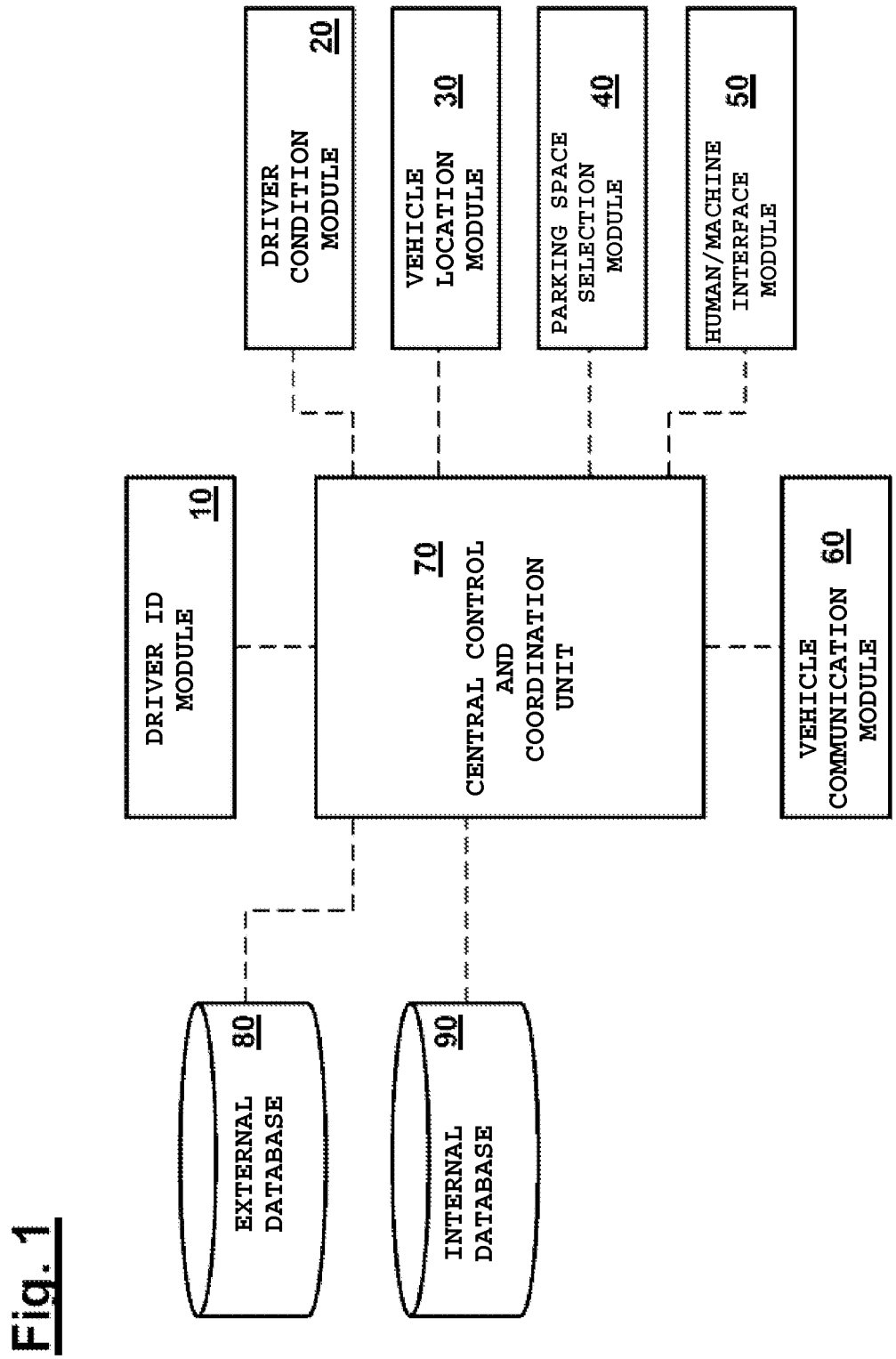
Figure 2:
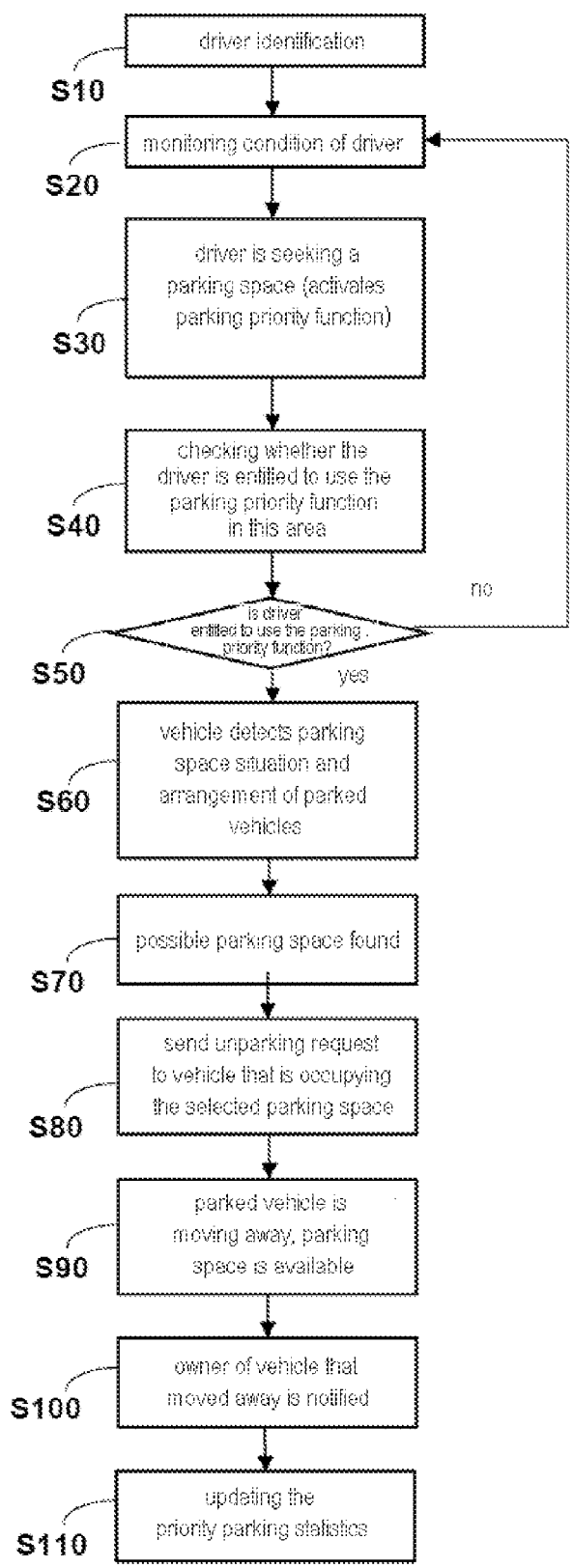
FIG. 2 shows a flow chart of an exemplary embodiment of a method according to the invention or the manner of operation of the system from FIG. 1.

In addition, the design of a system according to the invention and a possible process of the method according to the invention are described using an exemplary embodiment with reference to the schematic overview diagram of FIG. 1 and the flow chart of FIG. 2.

The system comprises, with reference to FIGS. 1 and 2, a driver identification module 10 that is capable of identifying or is configured to identify the driver of a certain motor vehicle (step S10 in FIG. 2) and to determine whether said person is entitled to use a parking priority function.

The system may further comprise a driver condition monitoring module 20 that is capable of analyzing the state of health of the driver. It is thereby preferably determined whether the driver is in a particular stress situation, is fatigued or is suffering from pain. This can e.g. be carried out with the use of camera-based face monitoring (mouth, facial expressions, eyes etc.), by direct monitoring of the actions and responses of the driver or even (in the presence of a suitable connection or communications capability) by direct access within the vehicle to vehicle information relating to the state of health of the driver, wherein e.g. it can be determined whether a driver is pregnant, whether a driver is suffering from a certain illness or is temporarily restricted in his mobility. Said driver condition monitoring corresponds to step S20 in the flow chart of FIG. 2.

A vehicle location module 30 is used when seeking a parking space (step S30) to determine whether the vehicle is in a local area in which the driver is entitled to use the parking priority function, wherein e.g. GPS-based location can be used (step S40). A parking space selection module 40 is capable of analyzing the spatial arrangement of the already-parked vehicles for the purpose of determining the most suitable parking space for the vehicle in question (step S60). The determination of the parking space dimensions and the dimensions of the already-parked vehicles can thereby take place. The selection of the most suitable parking space can take place here by means of the optimum compromise being found by taking into account any number and/or combination of factors such as the respective parking space dimensions, the distance between the parking space and the destination (e.g. the residence in question), the energy cost for a parked vehicle for leaving the parking space and for independent location of a new parking space and of the degree of difficulty of the respective required parking maneuver.

A Human/Machine Interface (HMI) module 50 enables the driver to activate the parking priority mode and can also inform the driver about the actions currently being carried out by the system.

A vehicle communications module 60 is responsible for the exchange of data between the respective motor vehicle and the outside world. The vehicle communications module 60 can be used to communicate with parked vehicles and to request the parked vehicles to move away and to seek a new parking space.

A central control and coordination module 70 is used to control and coordinate the previously described modules 10 to 60. Furthermore, the communications can take place with an external database 80 (e.g. relating to a driver with priority entitlements) and/or an internal database 90 (e.g. with vehicle data).

The external database 80 can e.g. contain an archive that includes the identification data of certain drivers and those local areas in which said drivers are entitled to use the priority parking function. Said database 80 can exist on a remote and e.g. central server managed by an authority or similar, or as a memory onboard the vehicle itself, in which case said memory may contains only information about the driver(s) of that particular vehicle. If the database 80 is located on a server, the communications can take place with the server by means of the vehicle communications module 60. By means of the driver identification module 10 and the driver condition monitoring module 20, classification is carried out with respect to the driver being entitled to use a certain parking area in more or less wide geographical areas.

The internal database 90 can contain the basic data that is required to determine the most suitable parking space for the relevant vehicle, e.g. the vehicle dimensions, information about an electric vehicle that requires a parking space with a charging station, etc.

TABLE 1

| Driver class | Local Area (to be identified using address, GPS) | Degree of Accessibility | Example |
| --- | --- | --- | --- |
| I (Normal) | Home address, workplace, ... | Priority in the event of critical driver condition | Young drivers, who therefore only want priority for a parking space close to their residence because they are very fatigued, because they are very late or because they feel bad, ... |
| II (Medium) | Home address, workplace, businesses, authorities, ... | Priority | Drivers that are temporarily suffering from nausea, disabilities or pain. |
| III (High) | Everywhere | Priority | Pregnant women, elderly persons, ... |

Table 1 shows an example of a possible classification scheme for drivers and the respective access level for each class.

In addition, an exemplary scenario during operation of the system according to the invention is described with reference to FIG. 3.

In the situation illustrated in FIG. 3, e.g. the driver of vehicle "A" wishes to return home (=residence or home location 300), wherein, however, disadvantageously there is no freely available parking space close to his residence.

The driver of the vehicle "A" is identified as an elderly person and belongs to class "III", referring to the above table 1. Persons belonging to said class III are entitled to use the parking priority function everywhere. In the present example, the driver of the vehicle "A" switches the parking priority function on. The system according to the invention thus starts to detect the surroundings, which can take place e.g. by using (e.g. ultrasound-based) parking assistance sensors, by means of radar sensors, by camera-based means or by means of a communications data exchange and/or a direct, vehicle-to-vehicle (V2V) data exchange.

In addition, additional information can be requested from the parked vehicles here, such as e.g. their ability to move away independently [autonomously and/or by remote-control] and seek another parking space, the remaining fuel supply or energy supply of the parked vehicles (which must be sufficient to carry out the unparking maneuver) etc. Once said information has been collected, according to the invention the most suitable parking space is calculated, which is preferably carried out with minimization of the costs in energy and time associated with the maneuver, minimization of the distance between the parking space and the home location and optimization of the utilization of the available parking space.

In the specific example of FIG. 3, five vehicles are contacted by vehicle "A", wherein a response is only received from vehicles "B", "C" and "D" and wherein only said vehicles ("B", "C" and "D") are capable of carrying out an independent unparking maneuver (i.e. the drivers of vehicles "B", "C" and "D" have agreed that their vehicles can be requested to carry out such a maneuver).

In the present example, all three of the parking spaces occupied by said vehicles would be sufficiently large for vehicle "A". Because, however, vehicle "D" is the smallest, it is easier for said vehicle "D" to carry out the unparking maneuver and to seek a new parking space. In addition, the movement of such a relatively small vehicle is associated with a lower energy cost compared to a movement of vehicle "C" or "B". In addition, the movement of the vehicle "D" would also enable better utilization of the available parking space by a larger vehicle. The unparking maneuver thus takes place following a suitable selection of the parking space of vehicle D as a suitable parking space (S70) and sending an unparking request (S80) for vehicle "D" (step S90). The owner of the vehicle "D" is notified about the new parking position of his vehicle (S100) and can be rewarded for the fact that he has enabled the previously described process. Furthermore, a statistic about the completed parking processes may be updated (S110).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
    assigning a priority to a vehicle based on an extent to which the vehicle is entitled to use a parking space;
    receiving information related to a second vehicle occupying the parking space; and
    based on the priority and the information, transmitting a request for the second vehicle to vacate the parking space.

2. The method of claim 1, wherein the information is received via a vehicle-to-vehicle data exchange between the vehicle and the second vehicle.

3. The method of claim 2, wherein the information comprises an ability of the second vehicle to depart the parking space independently and to seek another parking space.

4. The method of claim 2, wherein the information comprises an energy cost for the second vehicle to seek another parking space.

5. The method of claim 2, wherein the information comprises a remaining fuel supply and or energy supply of the second vehicle.

6. The method of claim 1, wherein the parking space is selected from a plurality of occupied parking spaces.

7. The method of claim 1, wherein the assignment of the priority is based upon a classification of a driver of the vehicle.

8. The method of claim 7, wherein the classification is based on information relating to a state of health of the driver of the vehicle.

9. The method of claim 1, further comprising:
    determining a current condition of a driver of the vehicle, and further basing the request on the current condition.

10. The method of claim 1, further comprising notifying via wireless communication a driver of the second vehicle that the second vehicle has left the parking space.

11. A method comprising:
    assigning a parking priority to a vehicle within a geographical area;
    receiving information related to a plurality of already-parked vehicles in the geographical area; and
    based on the priority and the information, determining that the vehicle is entitled to prioritized use of a parking space occupied by a one of the already-parked vehicles; and
    transmitting a request for the one of the already-parked vehicles to leave the parking space.

12. The method of claim 11, wherein the parking priority is based upon a classification of a driver of the vehicle.

13. A parking assistance system, comprising:
    a driver identification module determining a parking priority of a driver of a first vehicle;
    a vehicle location module determining whether the first vehicle is in an area in which the driver is entitled to prioritized parking;
    a parking space selection module analyzing a spatial arrangement of already-parked vehicles in the area and determining a suitable parking space for the first vehicle; and
    a vehicle communications module communicating with at least one of the already-parked vehicles and requesting that the at least one already-parked vehicle vacate the suitable parking space.

14. The system of claim 13, wherein the parking space selection module receives information from the at least one already-parked vehicle via a vehicle-to-vehicle data exchange.

15. The system of claim 14, wherein the information comprises an ability of the at least one already-parked vehicle to depart the parking space independently and to seek a different parking space.

16. The system of claim 14, wherein the information comprises an energy cost for the at least one already-parked vehicle to seek a different parking space.

17. The system of claim 14, wherein the information comprises a remaining energy supply and/or fuel supply of the at least one already-parked vehicle.

18. The system of claim 13, wherein the parking priority is based upon a classification of the driver.

19. The system of claim 18, wherein the classification is based on information relating to a state of health of the driver.

20. The system of claim 13, wherein the vehicle communication module is further operative to notify a driver of the at least one already-parked vehicle that the at least one already-parked vehicle has left the suitable parking space.

* * * * *